Figure 1:
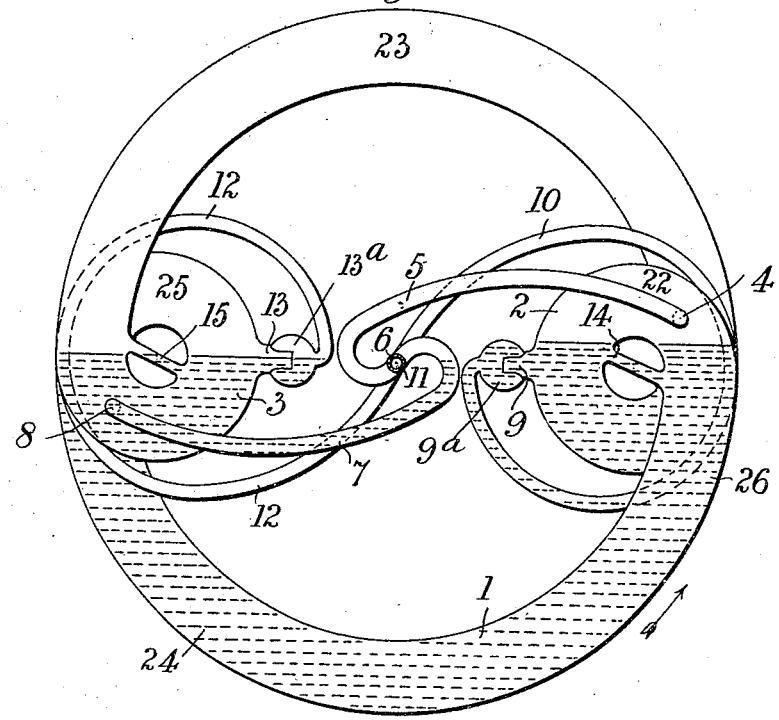

T. W. LOWDEN.
VACUUM PUMP.
APPLICATION FILED NOV. 16, 1908.

943,556.

Patented Dec. 14, 1909.

3 SHEETS—SHEET 1.

WITNESSES
BC Rust
J. J. McCarthy

INVENTOR.
T. W. Lowden
by Foster Freeman Watson & Coit
Attorneys

T. W. LOWDEN.
VACUUM PUMP.
APPLICATION FILED NOV. 16, 1908.

943,556.

Patented Dec. 14, 1909.
3 SHEETS—SHEET 2.

WITNESSES.
BC Rust
J.J. McCarthy

INVENTOR.
T. W. Lowden
by Foster Freeman Watson Hoit
Attorneys

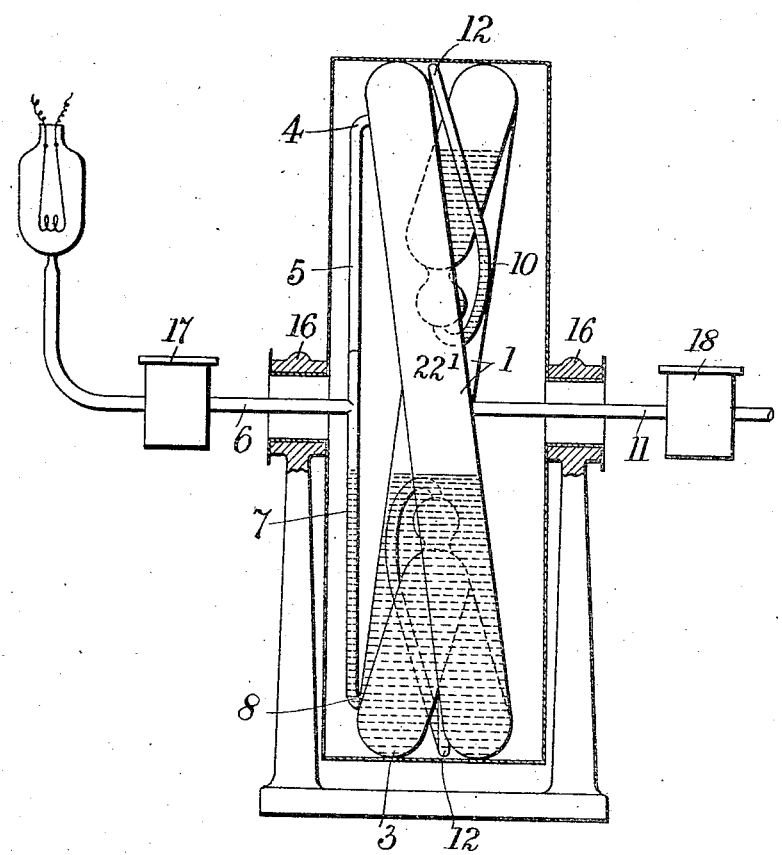

UNITED STATES PATENT OFFICE.

TOM WISEMAN LOWDEN, OF LONDON, ENGLAND.

VACUUM-PUMP.

943,556.  Specification of Letters Patent.  Patented Dec. 14, 1909.

Application filed November 16, 1908. Serial No. 462,901.

*To all whom it may concern:*

Be it known that I, TOM WISEMAN LOWDEN, a subject of the King of Great Britain, residing at London, England, have invented a new and useful Improvement in Vacuum-Pumps, of which the following is a specification.

My invention relates to mercury vacuum pumps of the kind wherein the mercury is contained in an endless annular tube adapted to be rotated and provided with one or more loops connected by tubes to a central exhausting passage and to the atmosphere, the said loop or loops acting as air traps in the known manner.

Rotary pumps of the above described kind as at present constructed, have been provided with loops or air traps connected to the main rotating tube by means of flexible connections such as india rubber tubes, such connections being leaky and rendering the pump unsuitable for use in the production of high vacua.

The present invention has for its object to overcome this serious defect, and to this end, the air traps or loops are formed integrally with the main rotating tube and are connected by a system of cross tubes specially arranged to prevent air entering the apparatus during the operation thereof.

A further object of my invention has been to construct an apparatus by means of which it may be possible to obtain a relatively high degree of exhaustion with a small expenditure of energy.

According to my invention, I provide an endless tube in the form of a circle looped or coiled upon itself at one or more points in its circumference, so that one or more loops are formed integral with the said endless tube. The circular tube is mounted in such a manner that it can be rotated around an axis passing through the center of the circle. From one point in a loop or convolution a tube is led to the center where it is arranged to be connected through a bearing with the chamber to be exhausted. From another point in the loop or convolution a tube passes through the center and is connected through the other bearing to a suitable form of exhaust pump or to the atmosphere. These connecting tubes are so situated and formed that in combination with the loop or convolutions in the circular tube they form chambers which are successively sealed and opened by mercury, so that the chamber to be exhausted and the exhaust pump are cut off from the apparatus at proper times when it is rotated. A sufficient quantity of mercury is introduced into the apparatus to nearly half fill the circular tube and also the loop or convolution in its circumference. When the apparatus is rotated the mercury tends to remain stationary at the lowest points of the circular tube and loop or loops and the apparatus is thus divided into compartments separated by bodies of mercury. When the apparatus is rotated the capacity of the compartments formed in the apparatus in connection with the ports is continually varying, the mercury acting as a piston; and on one side withdrawing gases or vapors from the chamber to be exhausted and simultaneously on the other side forcing gases or vapors previously withdrawn into the atmosphere or into a chamber from which they can be removed by an ordinary air pump.

When the apparatus is provided with only one loop or convolution in the circular tube with one port leading to the chamber to be exhausted and the other port connected to the ordinary air pump, the action of the apparatus is intermittent. By providing two or more loops the exhaustion can be made practically continuous.

In the accompanying drawings I have shown by way of example one form of mercury pump constructed in accordance with my invention having two loops in the tube.

Figure 2:
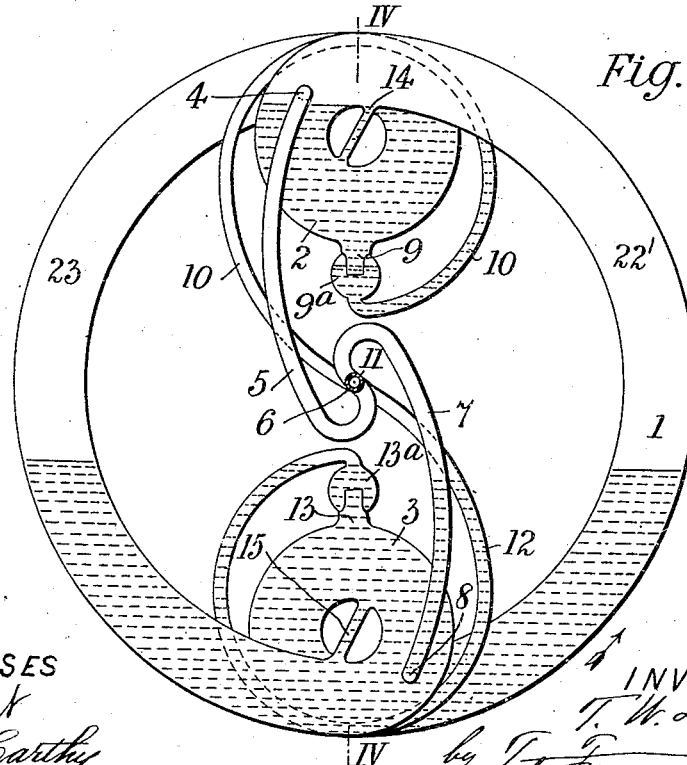
Figure 3:
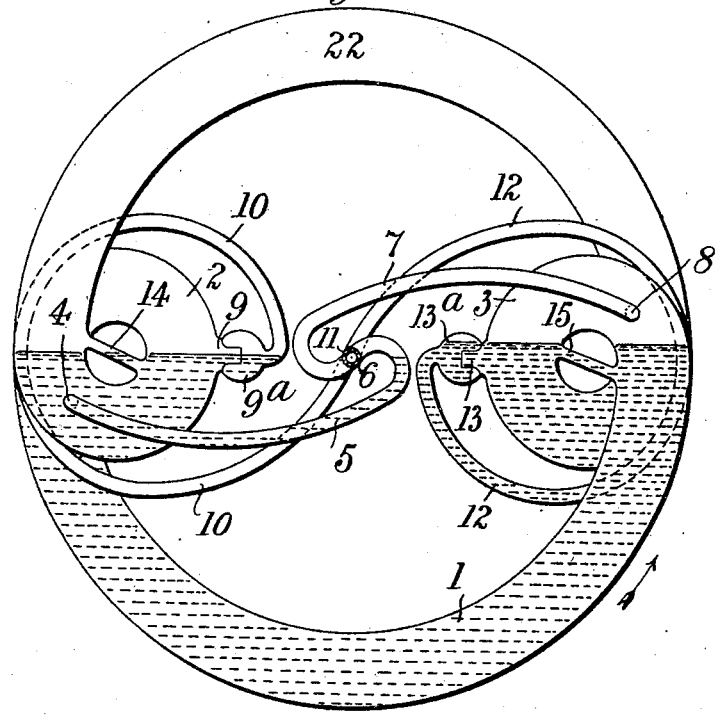
Figure 4:
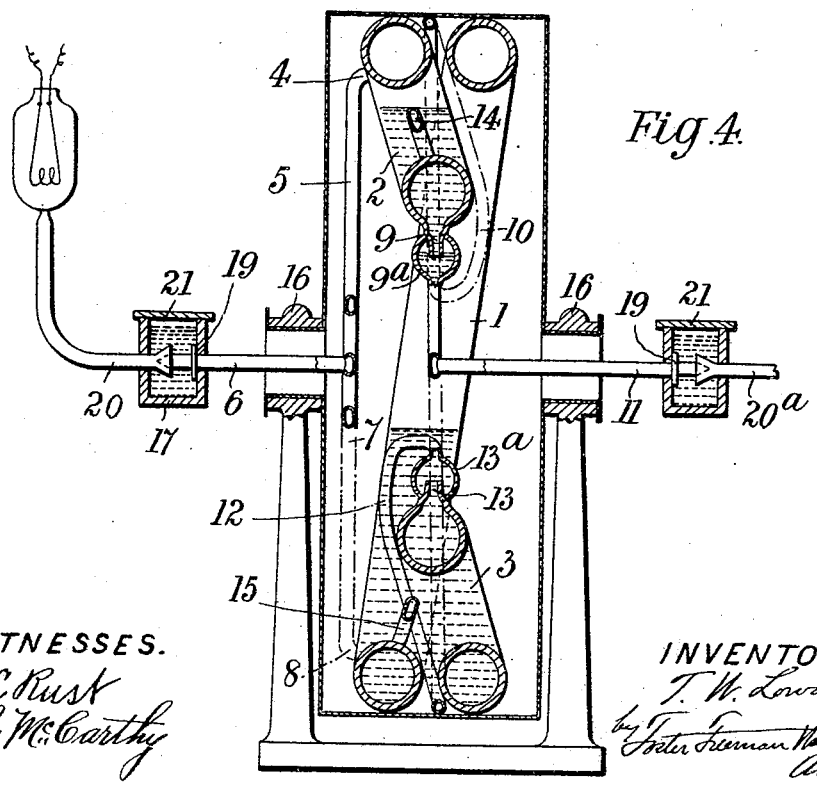

Figure 1 is a diagrammatic front view; Fig. 2 is a similar view showing the apparatus rotated through an angle of 90° from the position shown in Fig. 1; Fig. 3 is a similar view showing the apparatus rotated through a further 90°; that is to say through an angle of 180° from Fig. 1; Fig. 4 is a section on the line IV—IV of Fig. 2; Fig. 5 is a side view of the apparatus showing the manner of connecting the various compartments in the same respectively through the bearings to the chamber to be exhausted on the one side and to an ordinary pump or the atmosphere on the other.

Referring now to Fig. 1 the apparatus consists of an endless tube 1 bent to a substantially circular shape with two loops or coils 2 and 3 formed integrally therewith at opposite ends of a diameter. Opening into the loop 2 at or near its upper point at the point 4 is a tube 5 connected with axial tube 6 located at the center of the circle formed by the outer tube 1. The tube 7 similar to the tube 5 opens into the loop 3 at the point 8 and is also connected with the axial tube 6. At a point 9 near the bottom of the loop 2 a tube 10 opens into said loop, this tube being bent in the manner shown and connected to a second axial tube 11. Similarly the tube 12 connects the axial tube 11 with a point 13 at the upper part of the loop 3.

At the points 9 and 13 the tubes 10 and 12 respectively may be broken or interrupted as shown and be surrounded at that point by a bulb or chamber $9^a$ and $13^a$ respectively, such bulb serving to imprison any small quantities of air gases or vapors that may be retained in the mercury during the part of the rotation of the main tube when such air could otherwise pass back to the pump.

It will be understood that the tubes 7 and 12 perform the same functions in respect to the loop 3 as the tubes 5 and 10 perform for the loop 2. The rising branch of the loop 2 may be connected by a cross tube 14 with a part of the loop approximately diametrically opposite as shown and similarly the following branch of the loop 3 may be also connected to a part of the loop approximately diametrically opposite by a cross tube 15.

The apparatus is mounted in a frame or circular casing which is arranged to revolve in bearings indicated at 16 Fig. 5 co-axial with the tubes 6 and 11, these tubes being led out through the bearings on opposite sides of the casing to mercury seals 17 and 18. Suitable seals may consist of a vessel containing mercury through the side of which the tubes pass being provided with packing 19 to prevent leakage of mercury. The tubes within the mercury then make ground glass or steel connections with other tubes 20, $20^a$ passing out through the opposite side of the mercury containing vessel. The tube 20 which communicates with the tube 6 is attached to the apparatus to be exhausted, such as a lamp as indicated in the drawing, while the tube $20^a$ which communicates with the tube 11 either opens into the atmosphere or preferably is connected to an ordinary exhaust pump (not shown). The space 21 above the mercury seals of the tube 11 may be connected if desired to the ordinary air pump in order to effectively prevent leakage of air into the high vacuum which is being formed.

The operation of the pump is as follows:—The apparatus is supplied with sufficient mercury to approximately half fill it, that is to say, up to the level shown in Fig. 1 and in this position it will be observed that the space 22 in the upper part of the loop 2 is connected through the port 4 and tubes 5 and 6 with the apparatus to be exhausted. This space 22 is separated by the mercury in the lower part of the loop 2 from the space 23 in the upper half of the outer tube 1 and is separated from the loop 3 by the body of mercury 24 in the lower half of the outer tube 1. The tube 11 leading to the ordinary air pump which may be termed the low vacuum side of the apparatus is cut off from the loop 2 by mercury in the tube 10 and is connected to the space 25 of the upper part of the loop 3 through tube 12 and port 13. Port 8 in the loop 3 is sealed by the mercury in the lower part of said loop consequently the high vacuum tube 6 is cut off from the loop 3.

If the apparatus is rotated on its axis in the direction of the arrow (Fig. 1) the mercury retains the lowest position which it can in the apparatus and the effect is that it descends in the right hand side of the lower half of the outer tube 1 and also in the tube 10 and rises in the left hand half of the loop 2. Referring to the left hand side of Fig. 1 the mercury rises in the upper part of the loop 3 and also rises in the left hand half of the upper part of the tube 1, but falls in the right hand end of the tube 7. If the rotation be continued through a right angle from the position shown in Fig. 1 the apparatus will attain the position shown in Fig. 2. The space in connection with the tube 6 through tube 5 and port 4 is increased from that shown at 22 of Fig. 1 to that shown at 22' of Fig. 2. The air which was contained in the space 25 in the upper part of the loop 3 of Fig. 1 has been swept out through the port 13 and tube 12 and the whole of loop 3 is now filled with mercury. The space marked 23 in Fig. 1 has been reduced in capacity by the rise of the mercury in the left hand end of the upper part of the outer tube 1 in Fig. 1 and now only occupies about one quarter of the outer tube 1. This space is not, however, connected with the tube 10 because port 9 is sealed by the mercury in the lower part of loop 2 Fig. 2. The air in said space 23 is however being compressed more and more as the apparatus rotates. After the rotation is continued a little further the port 4 will be sealed by the rise of mercury in the left hand side of the loop 2 (Fig. 2) and consequently the space 22' will be cut off from the high vacuum tube 6. About the same time the port 9 will be uncovered, and by the mercury running out of tube 10, consequently the space 23 in Fig. 2 will be connected through port 9 and tube 10 with the low vacuum tube 11. This position of the apparatus is shown in Fig. 3. At about the same time as the port 9 is opened the port 4 in the tube 5 is closed by the mercury in the loop 2 covering the end. It will be observed that the position of the apparatus shown in Fig. 3 is the same as that shown in Fig. 1 except that the loop 3 is on the right hand side of the apparatus and loop 2 on the left hand side. If the rotation be further continued in the same direction the phenomena take place in the same order as hereinabove described, air being withdrawn through the tube 7 instead of through the tube 5.

The function of the cross tubes 14 and 15 is to permit mercury to overflow from or into the convolutions at certain periods in the rotation of the apparatus without its being necessary to travel over the top of the convolution. For instance, when the apparatus is rotated from the position shown in Fig. 1 the mercury in the right hand side of the loop 3 can flow through the tube 15 direct to the descending part of the tube 1 without passing over the bend in the loop 3. Similarly when the apparatus is approaching the position shown in Fig. 1 the loop 2 being filled with mercury, this mercury can flow from the top part of the loop 2 through the tube 14 to the part of the tube marked 26 without flowing over the bend of the loop 2.

It will be understood that in practice the apparatus is continuously rotated and its action when two or more loops are provided in the outer tube, may be regarded as practically continuous throughout the whole of the cycle. In the description of the operation it has been stated that mercury rises and falls in the various parts of the apparatus, this of course is not strictly speaking the case as the mercury merely alters its position relatively to the tubes and very little motion of translation occurs.

The shapes of the loops or convolutions in the path of the circular tube may be considerably varied. I prefer, however, to use circular loops in order that the mercury may move smoothly and easily without sudden variations in direction, since owing to the small pressure existing in the apparatus when a high vacuum is being obtained, the effect of a jar or shock due to what is known as mercury hammer may be injurious and tend to break the tubes. The ports may also be arranged at other suitable points in the apparatus, provided of course that the one port in connection with the high vacuum may open at approximately the same time as the other port closes.

The tube leading to the ordinary air pump may be of comparatively small cross section in order that mercury when flowing over a bend may completely fill the tube and so prevent entrance of gases which might afterward return into the compartment in communication with chamber to be exhausted. The tube leading from the apparatus to be exhausted is preferably somewhat larger in cross section so as to diminish as much as possible the resistance to the flow of air. The loops in the tubes near to where they join the axial tube 6 are provided to prevent the possibility of mercury entering tube 6 when the pump is in the position shown in Fig. 1. The apparatus may be made of glass but a metal tube is preferably employed. The use of copper for this purpose has the recommendation that mercury forms an amalgam with copper and insures an air-tight joint being made by the mercury when located in a bend of the tube. Little difficulty however will in general arise from leakage at these places, as the length of the column of mercury is considerable. The connections at the bearings to the chamber to be exhausted and to the exhaust pump must be made sufficiently air tight and I have found that steel bearings of suitable form immersed in a mercury seal are quite satisfactory.

It is clear that other liquids besides mercury may be employed in my improved pump. On account of its small vapor tension, however, mercury is the most suitable but in some cases heavy oils, or other liquids having small vapor tension may be employed.

What I claim and desire to secure by Letters Patent of the United States is:—

1. In a vacuum pump the combination of an endless rotatable main tube having a loop formed integrally therein, a tube adapted to connect said loop with the device that is to be exhausted and means including a tube for connecting said loop with the medium into which the exhaust air is to pass, said last named tube being broken or interrupted and provided at the point of interruption with a bulb or chamber adapted to imprison small quantites of air gases or vapors during a part of the rotation of the main tube and prevent them passing back, and so injuring the vacuum formed, said main tube containing a liquid whereby its interior is divided into compartments as the apparatus is rotated.

2. In a vacuum pump the combination of an endless rotatable main tube having a plurality of loops, formed integrally therein, a central exhausting tube adapted to be connected with the device that is to be exhausted, a tube adapted to connect said central exhausting tube with the aforesaid loops, a second central tube adapted to be open to or connected with the medium into which the exhaust air is to pass, a tube broken or interrupted at a point and adapted to connect said second central tube with the aforesaid loops, and a bulb or chamber surrounding the said point of interruption and adapted to imprison small quantities of air, gases or vapors during a part of the rotation of the main tube so as to prevent them passing back and injuring the vacuum formed; said main tube containing a liquid whereby its interior is divided into compartments as the apparatus is rotated.

In testimony whereof I have hereunto set my hand in presence of two subscribing witnesses.

TOM WISEMAN LOWDEN.

Witnesses:
 LIONEL S. CHALLES,
 H. F. BARRAT.